United States Patent
Bhoraskar et al.

(10) Patent No.: US 10,715,725 B2
(45) Date of Patent: Jul. 14, 2020

(54) METHOD AND SYSTEM FOR HANDLING 360 DEGREE IMAGE CONTENT

(71) Applicant: Samsung Electronics Co., Ltd., Gyeonggi-do (KR)

(72) Inventors: Anand Bhoraskar, Bangalore (IN); Kshirsagar Sumit Anil, Bangalore (IN); Basavaraja Shanthappa Vandrotti, Bangalore (IN); Amit Kumar, Bangalore (IN); Sandeep Jana, Bangalore (IN); Batchu Sudheer Kumar, Bangalore (IN); Cheolhee Choi, Gyeonggi-do (KR); Jinpyo Gwak, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/373,133

(22) Filed: Apr. 2, 2019

(65) Prior Publication Data

US 2019/0306422 A1    Oct. 3, 2019

(30) Foreign Application Priority Data

Apr. 2, 2018 (IN) .................. 201841012500 PS
Mar. 28, 2019 (IN) .................. 201841012500 CS

(51) Int. Cl.
- *H04N 5/232* (2006.01)
- *H04N 13/167* (2018.01)
- *G03B 17/56* (2006.01)

(52) U.S. Cl.
CPC ......... *H04N 5/23238* (2013.01); *G03B 17/56* (2013.01); *H04N 5/23296* (2013.01); *H04N 13/167* (2018.05)

(58) Field of Classification Search
CPC ............ H04N 5/23238; H04N 13/167; H04N 5/23296; G03B 17/568
See application file for complete search history.

(56) References Cited

U.S. PATENT DOCUMENTS 10,178,373 B2 *  1/2019  Ramachandra ........... G06T 7/85
2004/0042685 A1 *  3/2004  Zhou ...................... G06K 9/209
                                                         382/284

(Continued)

FOREIGN PATENT DOCUMENTS

JP    2017-021430    1/2017
WO    WO 2018/045108    3/2018

OTHER PUBLICATIONS

International Search Report dated Jul. 5, 2019 issued in counterpart application No. PCT/KR2019/003890, 10 pages.

*Primary Examiner* — Gevell V Selby
(74) *Attorney, Agent, or Firm* — The Farrell Law Firm, P.C.

(57) ABSTRACT

An apparatus and method are provided for handling 360 degree image content captured by a 360 degree camera. A method includes obtaining, by an electronic device, a sequence of 360 degree projection format image frames associated with the 360 degree image content and inertial measurement unit (IMU) rotation data associated with the 360 degree image content, computing, by the electronic device, a relative rotation of the 360 degree image content, and applying, by the electronic device, the relative rotation to at least one of the 360 degree projection format image frames to stabilize the 360 degree image content.

20 Claims, 18 Drawing Sheets

(56) References Cited

U.S. PATENT DOCUMENTS

| | | | |
|---|---|---|---|
| 2012/0262474 A1* | 10/2012 | Jancourtz | G06T 3/4007 |
| | | | 345/592 |
| 2013/0002807 A1 | 1/2013 | Vogel et al. | |
| 2016/0092080 A1 | 3/2016 | Swanson et al. | |
| 2018/0007352 A1 | 1/2018 | Chang et al. | |
| 2018/0063440 A1* | 3/2018 | Kopf | H04N 5/23267 |

* cited by examiner

Frame 1                    Frame 2

Relative Rotation($\theta_x$, $\theta_y$, $\theta_z$)

Points detected on frame 1 shown as circles in frame 1

Points tracked till frame 2 shown as circles in frame 2

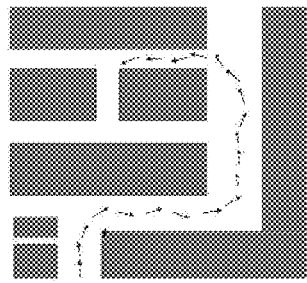
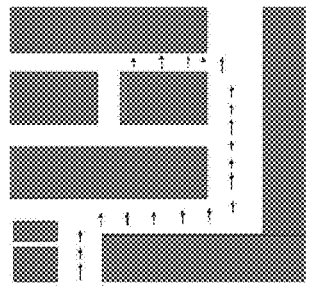
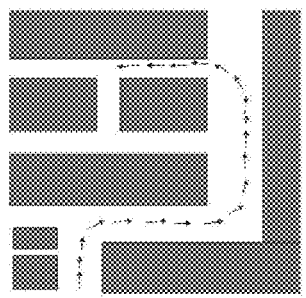
FIG.12A         FIG.12B         FIG.12C
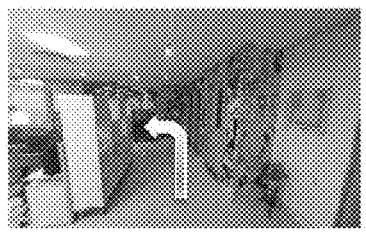
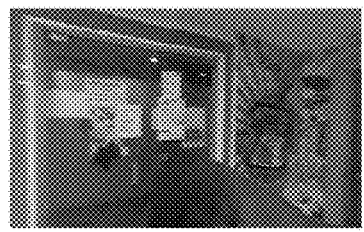
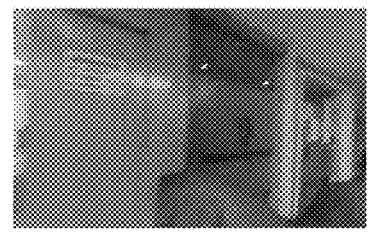
FIG.12D
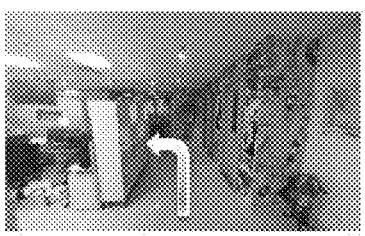
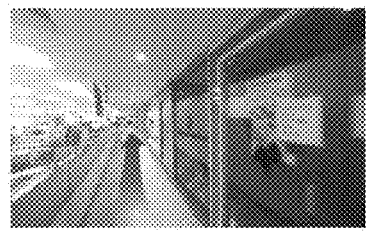
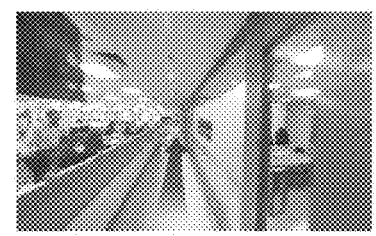
FIG.12E (a)

(b)

(c)

METHOD AND SYSTEM FOR HANDLING 360 DEGREE IMAGE CONTENT

CROSS-REFERENCE TO RELATED APPLICATION

This application is based on and claims priority under 35 U.S.C. § 119 to Indian Patent Application No. 201841012500 (PS) filed on Apr. 2, 2018, in the India Intellectual Property Office, and Indian Patent Application No. 201841012500 (CS) filed on Mar. 28, 2019, in the Indian Intellectual Property Office, the entire disclosure of each of which is incorporated herein by reference.

BACKGROUND

1. Field

The present disclosure relates generally to an image processing system, and more particularly, to a method and system for handling 360 degree image content.

2. Description of the Related Art

When a user of an electronic device captures a 360 degree video, the electronic device might be held tilted and experience inadvertent tremors. Consequently, the captured 360 degree videos, which are not aligned vertically, and might create an unpleasant viewing experience to the user.

Further, rotational information obtained from inertial measurement unit (IMU) sensors (e.g., a gyroscope and an accelerometer) is noisy and can create delay. A computer vision based method and system to stabilize 360 degree video exists, but resultant stabilized 360 degree video is still not tilt corrected effectively. Computer vision based methods and systems for tilt correction are either difficult to realize in real time and are often less accurate for scenarios having no vertical or horizontal edges.

Further, existing methods and systems for capturing 360 degree video have many bottlenecks, namely, losing the heading information (e.g., directional information or the like).

For example, in a scenario in which the 360 degree video is stabilized by aligning subsequent frames with respect to a first frame, if a person is driving along a curved road with the 360 degree video camera mounted on a bike, after some time, the stabilized video's front direction will not match with the road which will create a bad user experience.

As another example, the 360 degree video might not be vertically aligned if at a start of a video the user inadvertently holds the camera at 45 degrees to the vertical. consequently, the stabilized video will stay tilted by 45 degrees, and a viewer (e.g., using virtual reality (VR) goggles) will have to tilt their head to see the video. This also results in a bad user experience.

SUMMARY

Accordingly, the present disclosure is provided to address at least the problems and/or disadvantages described above and to provide at least the advantages described below.

An aspect of the present disclosure is to provide a method and apparatus for handling a 360 degree image content.

Another aspect of the present disclosure is to provide a method and apparatus that obtain a sequence of 360 degree projection format image frames associated with 360 degree image content and IMU rotation data associated with the 360 degree image content, where the 360 degree image content is captured by a 360 degree camera.

Another aspect of the present disclosure is to provide a method and apparatus that determine a first relative rotation angle for each of 360 degree projection format image frames with respect to a first 360 degree projection format image frame by tracking a set of feature points in each of the 360 degree projection format image frames.

Another aspect of the present disclosure is to provide a method and apparatus that determine a second relative rotation angle for each of 360 degree projection format image frames with respect to a first 360 degree projection format image frame by using IMU rotation data.

Another aspect of the present disclosure is to provide a method and apparatus that determine an individual offset for each of 360 degree projection format image frames.

Another aspect of the present disclosure is to provide a method and apparatus that estimate a universal offset by calculating geometric median of the individual offset values for each of 360 degree projection format image frames or continuously predicting universal offset using a signal processing filter.

Another aspect of the present disclosure is to provide a method and apparatus that determine an individual offset for each of 360 degree projection format image frames as a measure of difference between a relative rotation angle and an IMU rotation angle.

Another aspect of the present disclosure is to provide a method and apparatus that compute a relative rotation of 360 degree image content.

Another aspect of the present disclosure is to provide a method and apparatus that apply a relative rotation to each one of 360 degree projection format image frames to stabilize 360 degree image content.

Another aspect of the present disclosure is to provide a method and apparatus that estimate an angle difference value between yaw values of successive frames.

Another aspect of the present disclosure is to provide a method and apparatus that determine an angle difference value with a pre-determined threshold value.

Another aspect of the present disclosure is to provide a method and apparatus that apply a relative rotation to each one of 360 degree projection format image frames in order to maintain a head direction of 360 degree image content.

In accordance with an aspect of the present disclosure, a method is provided for handling 360 degree image content captured by a 360 degree camera. The method includes obtaining, by an electronic device, a sequence of 360 degree projection format image frames associated with the 360 degree image content and inertial measurement unit (IMU) rotation data associated with the 360 degree image content; computing, by the electronic device, a relative rotation of the 360 degree image content; and applying, by the electronic device, the relative rotation to at least one of the 360 degree projection format image frames.

In accordance with another aspect of the present disclosure, a method is provided for handling a 360 degree image content captured by a 360 degree camera. The method includes obtaining, by an electronic device, a sequence of 360 degree projection format image frames associated with the 360 degree image content and inertial measurement unit (IMU) rotation data associated with the 360 degree image content; estimating, by the electronic device, an angle difference value between yaw values of successive 360 degree projection format image frames; comparing, by the electronic device, the angle difference value with a pre-determined threshold value; and applying, by the electronic device, a relative rotation to at least one of the 360 degree projection format image frames, based on a result of the comparing.

In accordance with another aspect of the present disclosure, an electronic device is provided for handling a 360 degree image content captured by a 360 degree camera. The electronic device includes a processor; a memory; and a 360 degree image content handler, coupled with the processor and the memory, configured to obtain a sequence of 360 degree projection format image frames associated with the 360 degree image content and inertial measurement unit (IMU) rotation data associated with the 360 degree image content; compute a relative rotation of the 360 degree image content; and apply the relative rotation to at least one of the 360 degree projection format image frames.

In accordance with another aspect of the present disclosure, an electronic device is provided for handling a 360 degree image content captured by a 360 degree camera. The electronic device includes a processor; a memory; and a 360 degree image content handler, coupled with the processor and the memory, configured to obtain a sequence of 360 degree projection format image frames associated with the 360 degree image content and inertial measurement unit (IMU) rotation data associated with the 360 degree image content; estimate an angle difference value between yaw values of successive 360 degree projection format image frames; compare the angle difference value with a predetermined threshold value; and apply a relative rotation to at least one of the 360 degree projection format image frames, based on a result of the comparing.

BRIEF DESCRIPTION OF THE DRAWINGS

This above and other aspects, features, and advantages of certain embodiments of the present disclosure will be more apparent from the following detailed description taken in conjunction with the accompanying drawings, in which:

FIG. 12A illustrates a 360 degree image without video stabilization, according to an embodiment;

FIG. 12B illustrates a 360 degree image with video stabilization, according to an embodiment;

FIG. 12C illustrates a 360 degree image with video stabilization and maintaining heading direction, according to an embodiment;

FIG. 12D illustrates a 360 degree image without heading correction, according to an embodiment;

FIG. 12E illustrates a 360 degree image heading correction, according to an embodiment;

DETAILED DESCRIPTION

Figure 1:
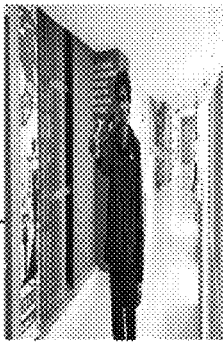
FIG. 1 illustrates various problems that occur during various image capturing techniques.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

The term "or" as used herein, refers to a non-exclusive or, unless otherwise indicated.

Examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components, etc., are physically implemented by analog and/or digital circuits such as logic gates, integrated circuits, microprocessors, microcontrollers, memory circuits, passive electronic components, active electronic components, optical components, hardwired circuits, etc., and may optionally be driven by firmware and software. The circuits may be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block.

Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although numerical terms, e.g., first, second, etc., may be used to describe various elements, these elements should not be limited by these terms. These terms are generally only used to distinguish one element from another.

In accordance with an embodiment, a method is provided for handling 360 degree image content captured by a 360 degree camera. The method includes obtaining, by an electronic device, sequence of 360 degree projection format image frames associated with the 360 degree image content and IMU rotation data associated with the 360 degree image content. Further, the method includes computing, by the electronic device, a relative rotation of the 360 degree image content, and applying, by the electronic device, the relative rotation to each one of the 360 degree projection format image frame to stabilize the 360 degree image content.

For example, the method can be used to stabilize, correct tilt, and maintain heading direction in a robust and effective manner while recording 360 degree video captured by the electronic device.

FIG. 1 illustrates various problems that occur using various image capturing techniques.

Referring to FIG. 1, image a illustrates a video capturing by a 360 camera. Due to various reasons, the 360 camera provides an unintended rotation while capturing the video.

Image b illustrates complete video in an equi-rectangular format, which is a standard format for storing 360 degree video.

Image c illustrates a frame affected due to tremors/vibrations and tilt, which results in uncomfortable viewing.

Image d illustrates IMU based tilt correction, which results in jitters due to imperfect IMU information with uncomfortable viewing.

Image e illustrates stabilized frames, which are not aligned with real horizon. This also results into uncomfortable viewing.

In the existing methods illustrated in FIG. 1, the video stabilization procedure does not take care of tilt correction. The video stabilization procedure aligns subsequent frames to remove shakiness/tremors, which does not ensure that a video output is tilt corrected.

Further, a conventional tilt correction procedure generates unstabilized video. For example, if an electronic device applies IMU relative rotation to a video, although tilt would be corrected, inherent noise in an IMU sensor results in jittery output.

Further, conventional video stabilization procedure and the tilt correction procedure do not maintain a heading direction. For example, if a user turns (e.g., makes a left turn), the output video should also reflect the turn.

Figure 2:
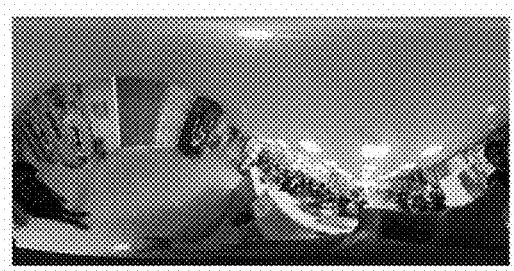
FIG. 2 illustrates a relative rotation of a camera in a 360 degree image content.
Figure 2:
Figure 2:
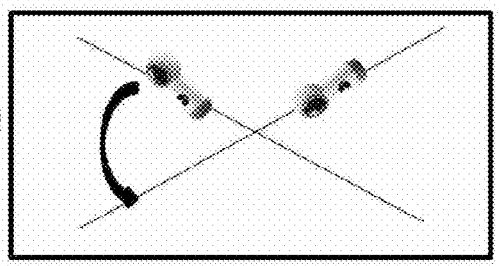

FIG. 2 illustrates a relative rotation of a camera in 360 degree image content.

Referring to FIG. 2, a relative rotation angle (e.g., a 3D angle or the like) is provided for each of the received frames with respect to a first frame of a sequence of frames. The relative rotation angle is computed by tracking feature points in each frames. Specifically, FIG. 2 shows a relative rotation among 2 frames.

Figure 3:
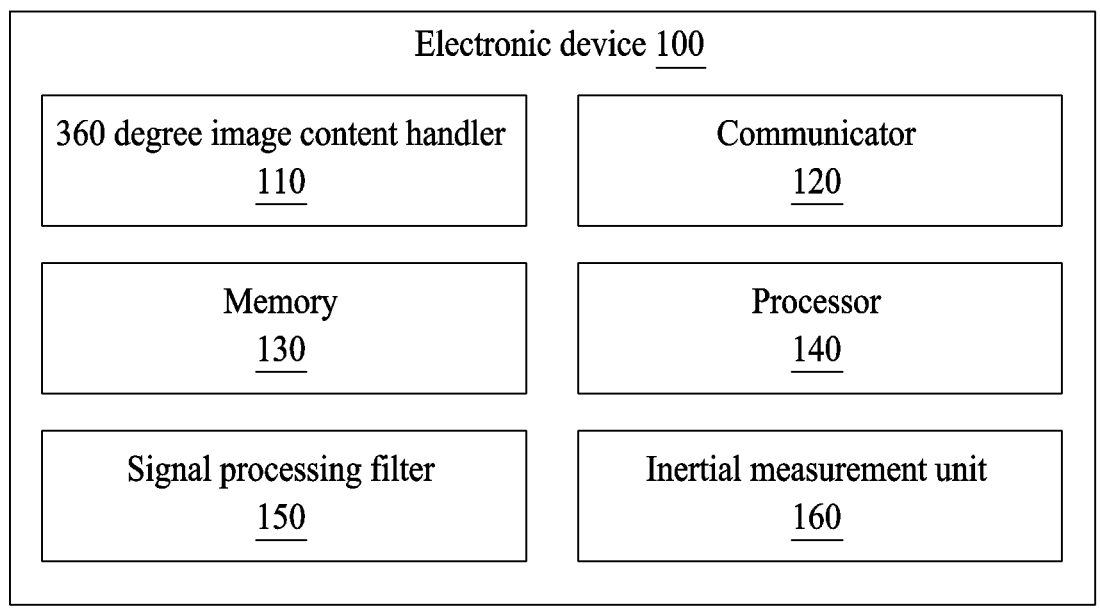
FIG. 3 illustrates an electronic device for handling 360 degree image content, according to an embodiment.

FIG. 3 illustrates an electronic device for handling 360 degree image content, according to an embodiment.

Referring to FIG. 3, an electronic device 100 may be, but not limited to, a smart phone, a tablet computer, a drone-mounted camera, a head-mounted camera, a handheld camera, a mobile device, a personal digital assistance (PDA), a multimedia device, a video device, a smart watch, etc.

The electronic device 100 includes a 360 degree image content handler 110, a communicator 120, a memory 130, a processor 140, a signal processing filter 150, and an inertial measurement unit (IMU) 160.

The processor 140 is coupled with the 360 degree image content handler 110, the communicator 120, the memory 130, the signal processing filter 150, and an inertial measurement unit 160.

The 360 degree image content handler 110 obtains a sequence of 360 degree projection format image frames associated with the 360 degree image content and IMU rotation data associated with the 360 degree image content. The 360 degree image content is captured by the 360 degree camera. The IMU rotation data is obtained by the inertial measurement unit 160 (e.g., a gyroscope, an accelerometer, etc.).

The various projection formats, which are known to represent the 360 degree image content, include an equi-rectangular format, an Icosahedron format, an octahedral format, a cube mapping format, etc.

After obtaining the sequence of 360 degree projection format image frames associated with the 360 degree image content and the IMU rotation data associated with the 360 degree image content, the 360 degree image content handler 110 determines a first relative rotation angle for each of the 360 degree projection format image frames with respect to a first 360 degree projection format image frame by tracking a set of feature points in each of the 360 degree projection format image frames. The set of feature points tracked will be explained in more detail below with reference to FIGS. 7 and 8.

Further, the 360 degree image content handler 110 determines a second relative rotation angle for each of the 360 degree projection format image frames with respect to the first 360 degree projection format image frame by using the IMU rotation data. Further, the 360 degree image content handler 110 determines an individual offset for each of the 360 degree projection format image frames.

The individual offset for each of the 360 degree projection format image frames may be determined as a measure of difference between the relative rotation angle and the IMU rotation angle.

Further, the 360 degree image content handler 110 estimates a universal offset by calculating geometric median of the individual offset values for each of the 360 degree projection format image frames or by continuously predicting universal offset using the signal processing filter 150. The determination of the universal offset and individual offset are explained in more detail below with reference to FIG. 11.

Further, the 360 degree image content handler 110 computes the relative rotation of the 360 degree image content.

After computing the relative rotation of the 360 degree image content, the 360 degree image content handler 110 applies the relative rotation to each one of the 360 degree projection format image frame to stabilize the 360 degree image content.

Further, the 360 degree image content handler 110 estimates an angle difference value between yaw values of successive frames, and determines the angle difference value with a pre-determined threshold value.

The angle difference value with the pre-determined threshold value may be determined by detecting whether an angle difference of yaw values of first and second 360 degree projection format image frames is less than the pre-determined threshold value, and compensating the yaw value of the second frame.

The angle difference value with the pre-determined threshold value may be determined by detecting whether an angle difference of yaw values of first and second 360 degree projection format image frames is greater than the pre-determined threshold value, and smoothing a yaw value of the second frame.

Further, the 360 degree image content handler 110 applies the relative rotation to each one of the 360 degree projection format image frame to maintain a head direction of the 360 degree image content.

The processor 140 execute instructions stored in the memory 130 to perform various processes. The communicator 120 communicates between internal hardware components and with external devices via one or more networks.

The memory 130 stores instructions to be executed by the processor 140. The memory 130 may include non-volatile storage elements, e.g., magnetic hard discs, optical discs, floppy discs, flash memories, or forms of electrically programmable memories (EPROM) or electrically erasable and programmable (EEPROM) memories.

In addition, the memory 130 may be considered a non-transitory storage medium. The term "non-transitory" indicates that the storage medium is not embodied in a carrier wave or a propagated signal. However, the term "non-transitory" should not be interpreted that the memory 130 is non-movable.

The memory 130 may be configured to store large amounts of information.

A non-transitory storage medium may store data that can, over time, change (e.g., in Random Access Memory (RAM) or cache).

Although the FIG. 3 illustrates the electronic device 100 including certain components, the present disclosure is not limited thereto. For example, the electronic device 100 may include less or more components.

Further, the names of the components in FIG. 3 are used only for illustrative purposes and do not limit the scope of the disclosure.

One or more the components can be combined together to perform same or substantially similar function to handle the 360 degree image content.

Figure 4:
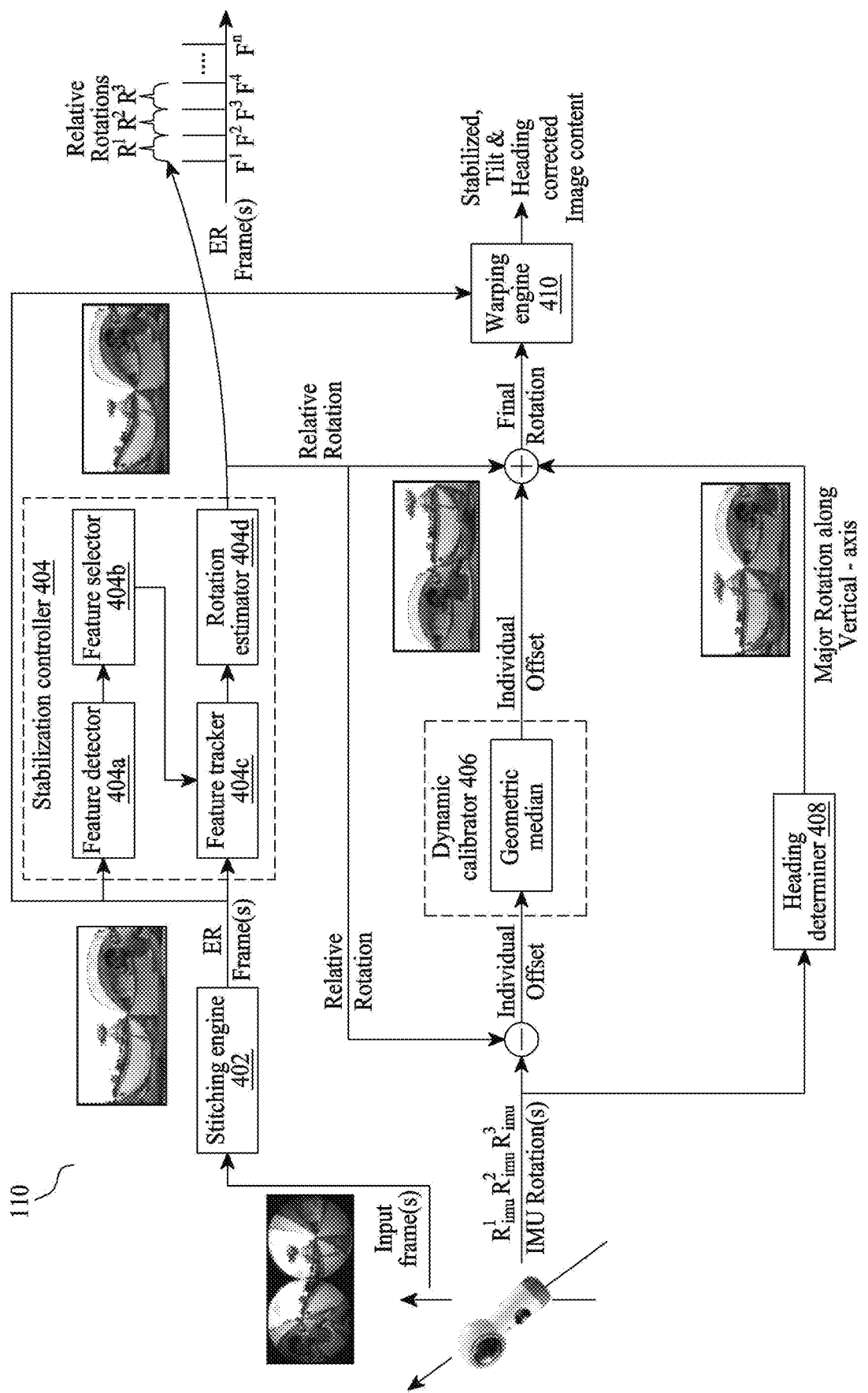
FIG. 4 illustrates a 360 degree image content handler included in an electronic device, according to an embodiment.

FIG. 4 illustrates a 360 degree image content handler, according to an embodiment.

Referring to FIG. 4, a 360 degree image content handler 110 includes a stitching engine 402, a stabilization controller 404, a dynamic calibrator 406, a heading determiner 408 and a warping engine 410. The stabilization controller 404 includes a feature detector 404*a*, a feature selector 404*b*, a feature tracker 404*c*, and a rotation estimator 404*d*.

The stitching engine 402 process the input equi-rectangular (ER) frame and generates the 360 degree image by stitching the images. Further, the stabilization controller 404 obtains a sequence of 360 degree projection format image frames associated with the 360 degree image content and the IMU rotation data associated with the 360 degree image content.

After obtaining the sequence of 360 degree projection format image frames associated with the 360 degree image content and the IMU rotation data associated with the 360 degree image content, the stabilization controller 404 determines the first relative rotation angle for each of the 360 degree projection format image frames with respect to the first 360 degree projection format image frame by tracking the set of feature points in each of the 360 degree projection format image frames using at least one of the feature detector 404*a*, the feature selector 404*b*, and the feature tracker 404*c*. The stabilization controller 404 determines the second relative rotation angle for each of the 360 degree projection format image frames with respect to the first 360 degree projection format image frame by using the IMU rotation data by the rotation estimator 404*d*. The stabilization controller 404 determines the individual offset for each of the 360 degree projection format image frames.

Further, the stabilization controller 404 estimates the universal offset by calculating geometric median of the individual offset values for each of the 360 degree projection format image frames or by continuously predict the universal offset using the dynamic calibrator 406. Further, the stabilization controller 404 computes the relative rotation of the 360 degree image content.

After computing the relative rotation of the 360 degree image content, the stabilization controller 404 applies the relative rotation to each one of the 360 degree projection format image frame to stabilize the 360 degree image content.

The heading determiner 408 estimates the angle difference value between yaw values of successive frames. Further, the heading determiner 408 determines the angle difference value with the pre-determined threshold value. The heading determiner 408 applies the relative rotation to each one of the 360 degree projection format image frame in order to maintain the head direction of the 360 degree image content.

The warping engine 410 provides the stabilized, tilt corrected, and heading corrected image content.

Although the FIG. 4 illustrates various hardware components of the 360 degree image content handler 110, the present disclosure is not limited thereto. For example, the 360 degree image content handler 110 may include fewer or more components. Further, the la names of the components do not limit the scope of the disclosure. One or more components can be combined together to perform same or substantially similar function to handle s handle the 360 degree image content.

Figure 5:
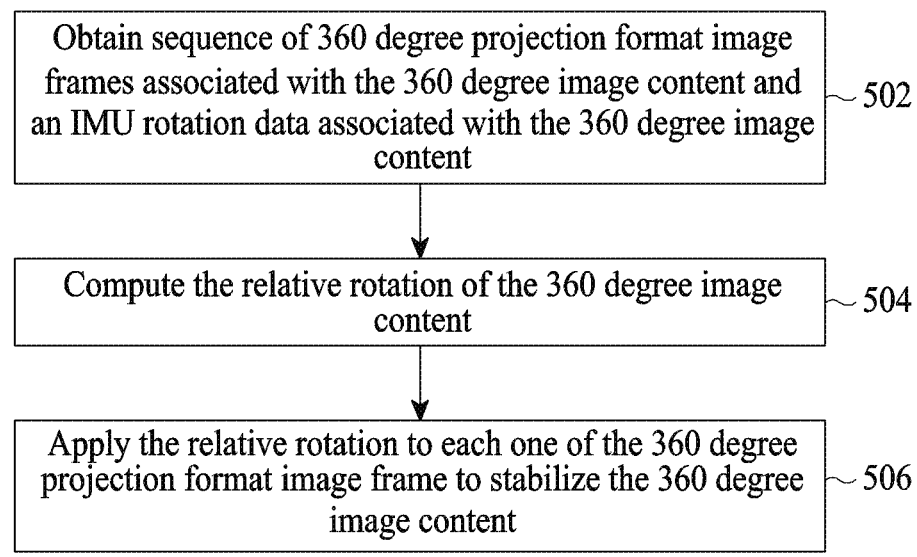
FIG. 5 is a flow diagrams illustrating an operation for handling 360 degree image content, according to an embodiment.

FIG. 5 is a flow diagram illustrating an operation for handling 360 degree image content, according to an embodiment.

Referring to FIG. 5, at step 502, an electronic device, e.g., the 360 degree image content handler 110, obtains a sequence of 360 degree projection format image frames associated with 360 degree image content and IMU rotation data associated with the 360 degree image content.

At step 504, the 360 degree image content handler 110 computes the relative rotation of the 360 degree image content.

At 506, the 360 degree image content handler 110 applies the relative rotation to each one of the 360 degree projection format image frame to stabilize the 360 degree image content.

Figure 6:
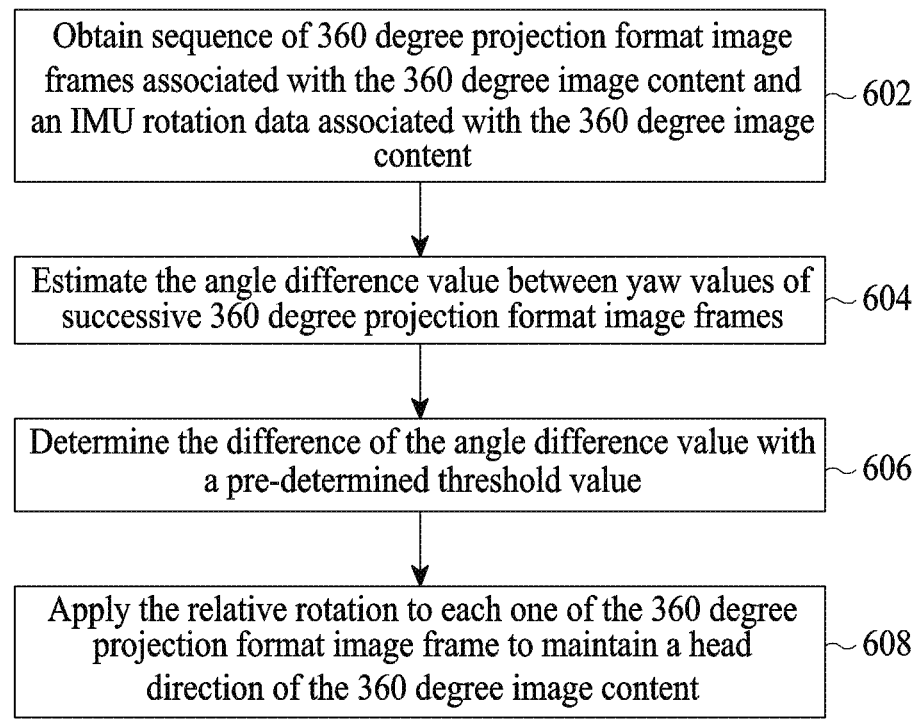
FIG. 6 is a flow diagrams illustrating an operation for handling 360 degree image content, according to an embodiment.

FIG. 6 is a flow diagram illustrating an operation for handling 360 degree image content, according to an embodiment.

Referring to FIG. 6, at 602, an electronic device, e.g., the 360 degree image content handler 110, obtains a sequence of 360 degree projection format image frames associated with 360 degree image content and IMU rotation data associated with the 360 degree image content.

At step 604, the 360 degree image content handler 110 estimates the angle difference value between yaw values of successive 360 degree projection format image frames.

At step 606, the 360 degree image content handler 110 determines the angle difference value with the pre-determined threshold value.

At step 608, the 360 degree image content handler 110 applies the relative rotation to each one of the 360 degree projection format image frames in order to maintain the head direction of the 360 degree image content.

The various actions, acts, blocks, steps, etc., in the flow diagrams of FIGS. 5 and 6 may be performed in the order presented, in a different order, or simultaneously. Further, in some embodiments, some of the actions, acts, blocks, steps, or the like may be omitted, added, modified, skipped, etc., without departing from the scope of the disclosure.

Figure 7:
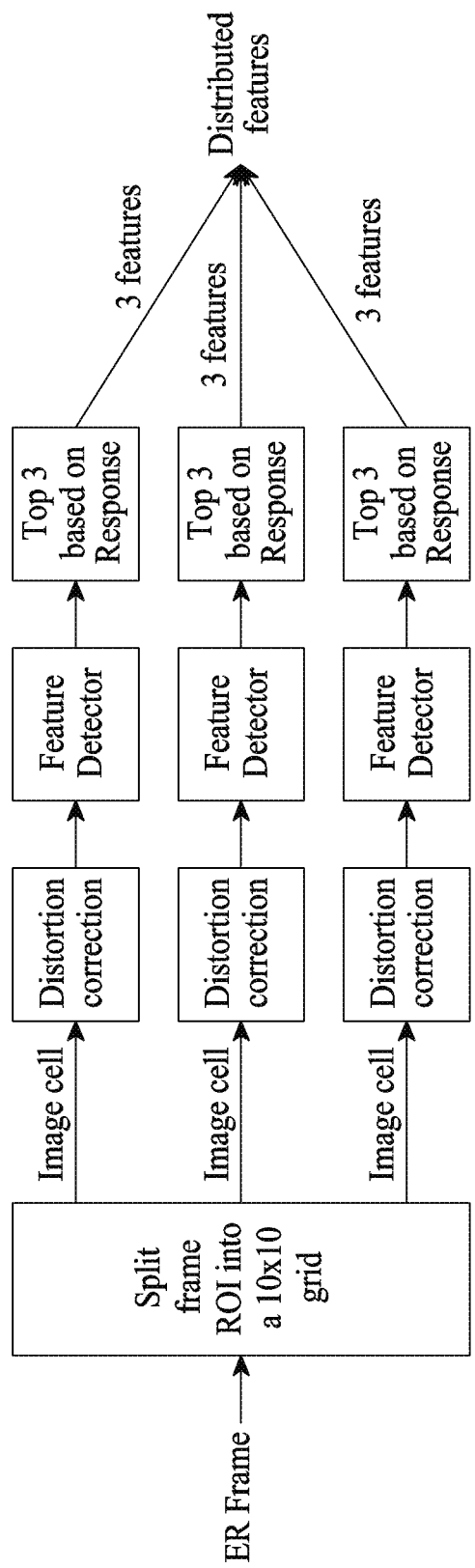
FIG. 7 illustrates an operation of feature point selection and detection, according to an embodiment.

FIG. 7 illustrates feature point selection and detection, according to an embodiment.

Referring to FIG. 7, in order to estimate better video stabilization, global motion estimated and local motion is discarded. The global motion is a motion in a scene while capturing the video and the local motion is a motion in an object while capturing the video.

An electronic device applies the feature based procedure to estimate the relative rotation and ensure to represent only global motion. The global motion is correctly estimated when the feature points are evenly distributed. In the electronic device, the input ER image is split into multiple grids, (e.g., a 10×10 grid). The electronic device estimates the feature points in each grid and keeps only the top best feature points (e.g., keeps only the top 3 points), which helps reduce complexity. Further, the electronic device tracks the detected points in the next few frames (e.g., 5 frames).

The electronic device retains only feature points that are available in all of the frames. The electronic device computes the rotation or correction matrix for the frames.

Further, the electronic device applies the feature detection on the last rotated frame and repeats the above procedure.

In the case of low light scenes, the electronic device detects the feature and detects that performance is very poor, Thereafter, the electronic device uses only IMU data for correction.

In order to decide whether or not the frame is suitable for vision-based stabilization, a threshold may be applied. The electronic device may set a threshold, which is at least one feature point in N (e.g., 15) grids. Whenever the frame does not satisfy the condition, then only IMU data is applied for correction.

Figure 8:
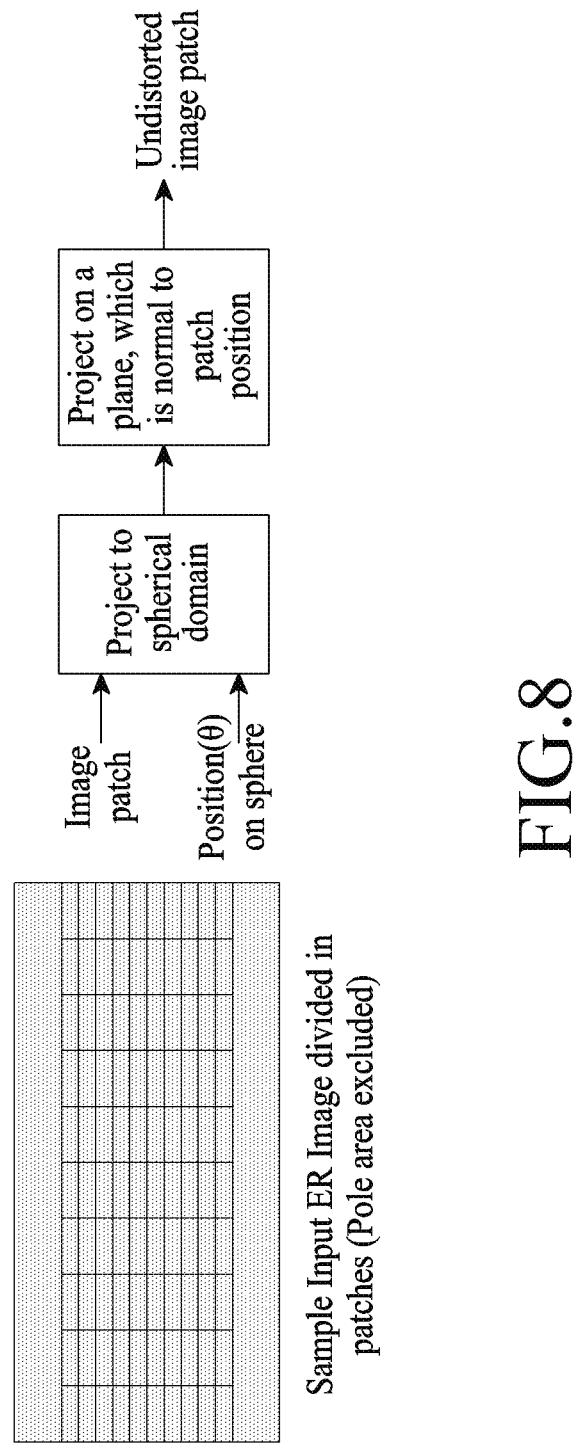
FIG. 8 illustrates a distortion correction based on a feature point selection, according to an embodiment.

FIG. 8 illustrates distortion correction based on feature point selection, according to an embodiment.

Referring to FIG. 8, each image patch is projected in a spherical domain. The spherical representation is converted to 2d image by projecting on a tangent plane. In order to provide the better accuracy of the video, the feature detection is done on the undistorted patch.

Figure 9A:
FIG. 9A illustrates a conventional output of a feature detection.

FIG. 9A illustrates a conventional output of a feature detection. Based on existing methods, a large number of points are clustered in a textured area.

Figure 9B:
FIG. 9B illustrates an output of a feature detection, according to an embodiment.

FIG. 9B illustrates an output of a feature detection, according to an embodiment.

Referring to FIG. 9B, the points are better distributed by enforcing grid based feature detection.

Figure 10:
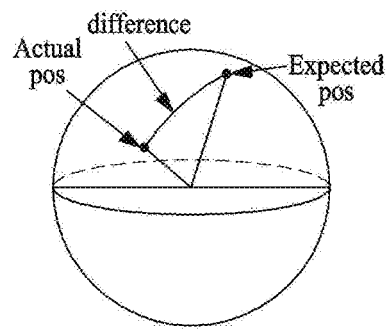
FIG. 10 illustrates feature point selection using an IMU, according to an embodiment.
Figure 10:
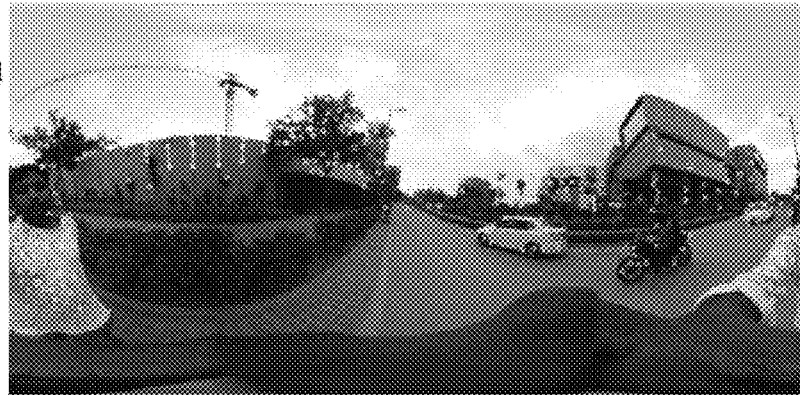
Figure 10:

FIG. 10 illustrates feature point selection using IMU, according to an embodiment.

Referring to FIG. 10, a method can be used to discard feature points that have local motion and select the feature points that have global motion for better estimation of relative rotation between the frames. In the method, the electronic device receives IMU relative rotation angles and ER frames. The electronic device tracks the feature points from the first frame to the second frame. Further, the electronic device applies the IMU relative rotation angle to transform feature points in first frame to their expected position.

The electronic device determines the angle between the positions of tracked feature points in the second frame with their expected position and compare the angular displacement with a pre-determined threshold. The electronic device accepts the feature point if difference is less than threshold and classifies the feature points as global motion. The electronic device rejects the feature point if difference is less than threshold and classifies the feature point as the local motion.

As illustrated in the FIG. 10, for each tracked point, a line is drawn from the tracked point to the "expected position according to IMU Rotation". The points in frame 1 have a higher displacement than threshold, hence, are rejected (local motion), and the points in frame 2 are accepted as global motion.

Figure 11:
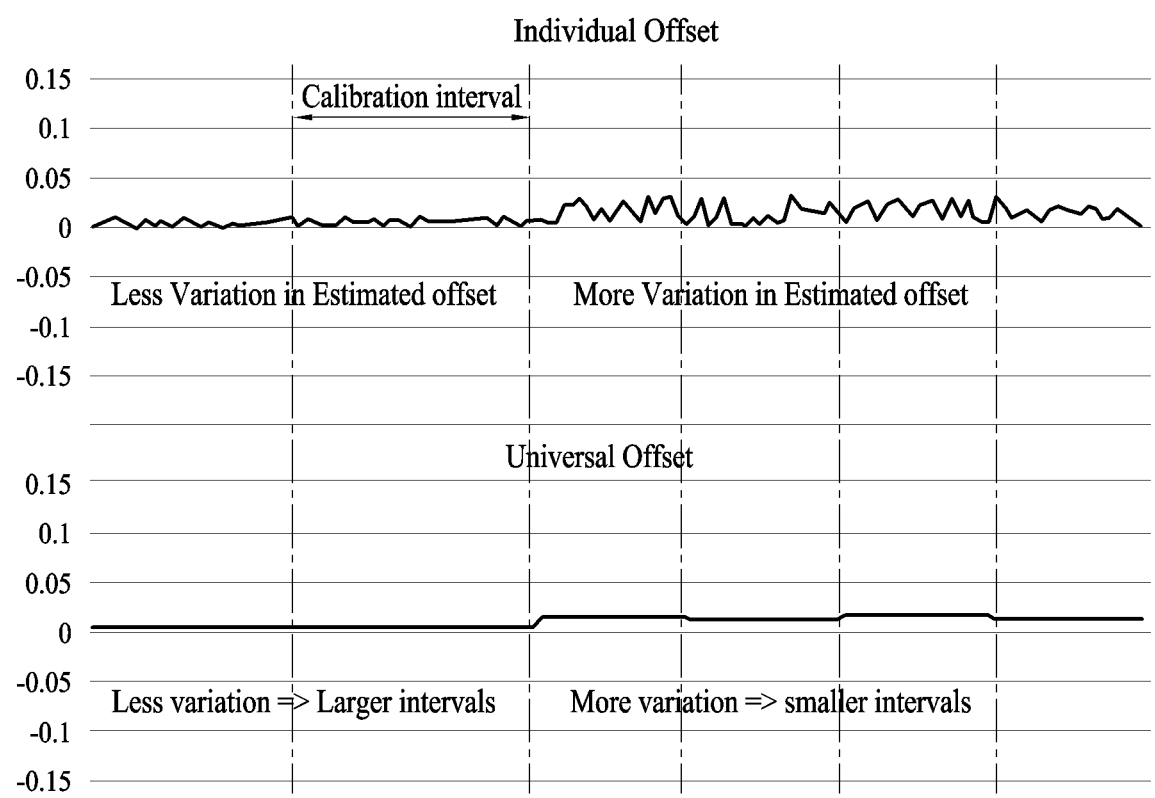
FIG. 11 illustrates dynamic recalibration, according to an embodiment.

FIG. 11 illustrates dynamic recalibration, according to an embodiment.

Referring to FIG. 11, a method can be used to dynamically recalibrate an offset evaluation interval based on a deviation of an estimate offset from individual offset values. In the methods, an electronic device receives the offset values over evaluation interval and estimates offset for them. The electronic device evaluates the mean of absolute differences between individual offset values and estimate offset. The electronic device then compares the mean with a predetermined threshold by keeping the offset evaluation interval high, if mean is smaller than threshold. The electronic device 100 compares the mean with a predetermined threshold by keeping interval lower, if mean is greater than threshold.

FIG. 12A illustrates a 360 degree image without video stabilization. FIG. 12B illustrates a 360 degree image with video stabilization. FIG. 12C illustrates a 360 degree image with video stabilization and maintaining heading direction. FIG. 12D illustrates a 360 degree image without heading correction. FIG. 12E illustrates a 360 degree image with heading correction.

Figure 13:
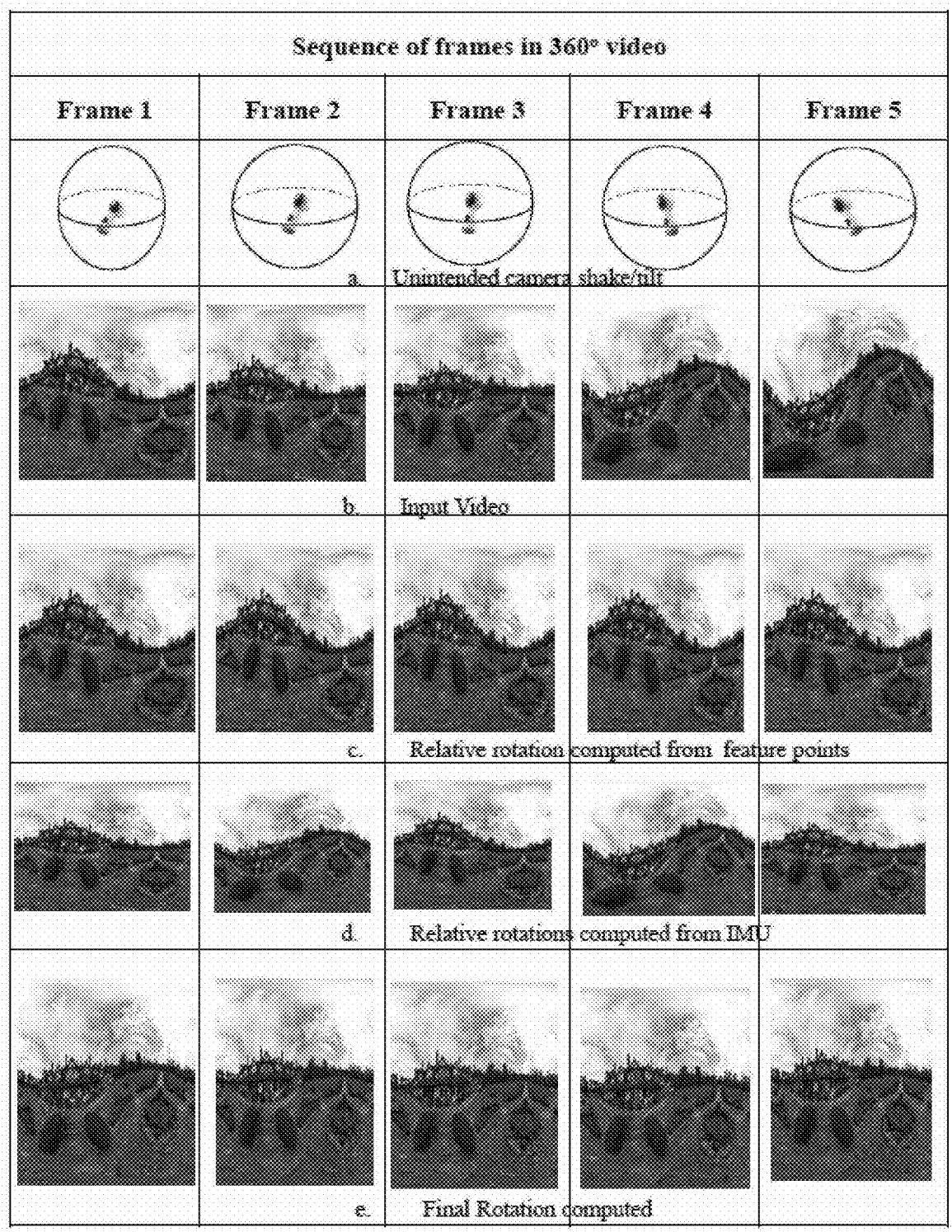
FIG. 13 illustrates a 360 degree image with tilt correction, according to an embodiment.

FIG. 13 illustrates a 360 degree image with tilt correction, according to an embodiment.

Referring to FIG. 13, row a indicates the unintended shake/tilt of camera as demonstrated in 5 subsequent frames. Row b indicates the 5 frame of input video that is affected by the shakiness/tremors and tilt while recording 3600 videos, and results in uncomfortable viewing.

Row c indicates a relative rotation computed from a feature point (i.e., successive frames are aligned with first reference frame so that the shakiness is removed but frames tilted).

Row d indicates that relative rotations computed from IMU, where the tilt is corrected but shakiness is present due to IMU noise.

Row e indicates a final rotation computed using 'Universal offset from the IMU' & 'Relative rotation from feature points', which results in removing the shakiness as well as correcting the tilt to provide better pleasant viewing experience.

Figure 14:
FIG. 14 illustrates orientation error correction in a 360 degree video, according to an embodiment.
Figure 14:
Figure 14:

FIG. 14 illustrates orientation error correction in a 360 degree video, according to an embodiment.

Referring to FIG. 14, row (a) indicates images with no stabilization, row (b) indicates images with stabilization, but without tilt correction, and row (c) indicates images with both tilt correction and stabilization.

As illustrated in FIG. 14, an electronic device receives sequence of stitched 360 degree frames and corresponding IMU rotation data (e.g., inertial measurement unit—gyroscope and accelerometer), and computes the relative rotation angle (e.g., 3D angle) for each of the received frames with respect to a first frame of the sequence of frames. The relative rotation angle is computed from tracked feature points between two or more frames using geometric transformation techniques for, e.g., epipolar geometry.

Further, the electronic device determines the offset for each of the frames by calculating the difference between the relative rotation angle and the IMU rotation angle and estimating the universal offset by using geometric median of determined offsets for each of the frames or by using linear quadratic estimator. The electronic device applies the estimated universal offset to each of the frame to vertically align the frame to correct the orientation errors in the 360 degree video.

Figure 15:
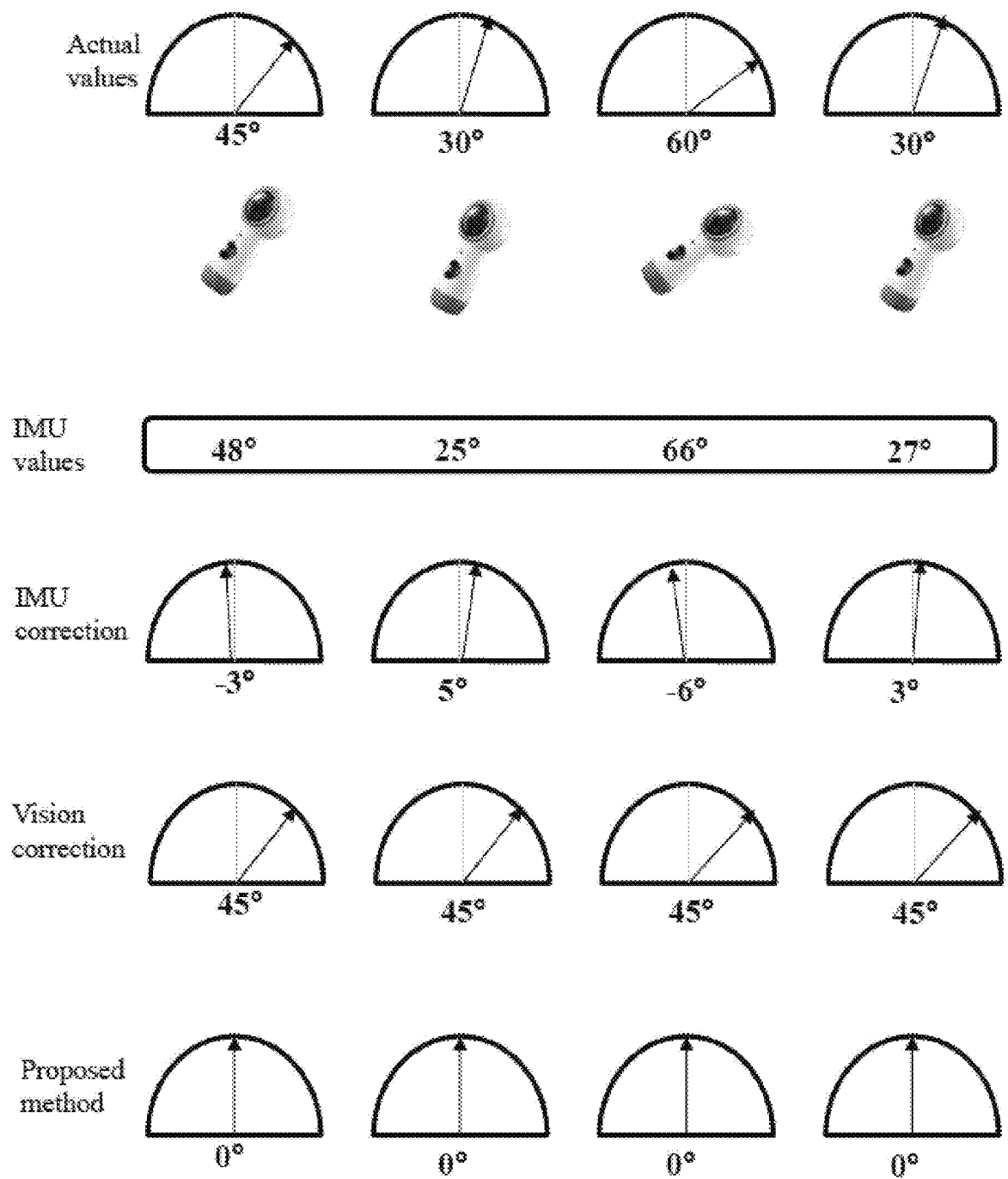
FIG. 15 illustrates a method for stabilizing and tilt correcting 360 degree image content, according to an embodiment.

FIG. 15 illustrates a method for stabilizing and tilt correcting an output in 360 degree image content, according to an embodiment.

Referring to FIG. 15, an electronic device can be used to estimate an offset between IMU and vision, despite high errors, in order to provide a stabilized and tilt corrected output. In the input video, an arrow represents the vertical direction in the video. The IMU values are given by the sensor. If only IMU rotation values are used to stabilize the video, the IMU values try to align frames to vertical, but because of errors in the IMU values, the output video is not stable. If the relative rotation is used, the video is stabilized but all frames are aligned to the first frame as the vision does not have information about true vertical direction.

Figure 16:
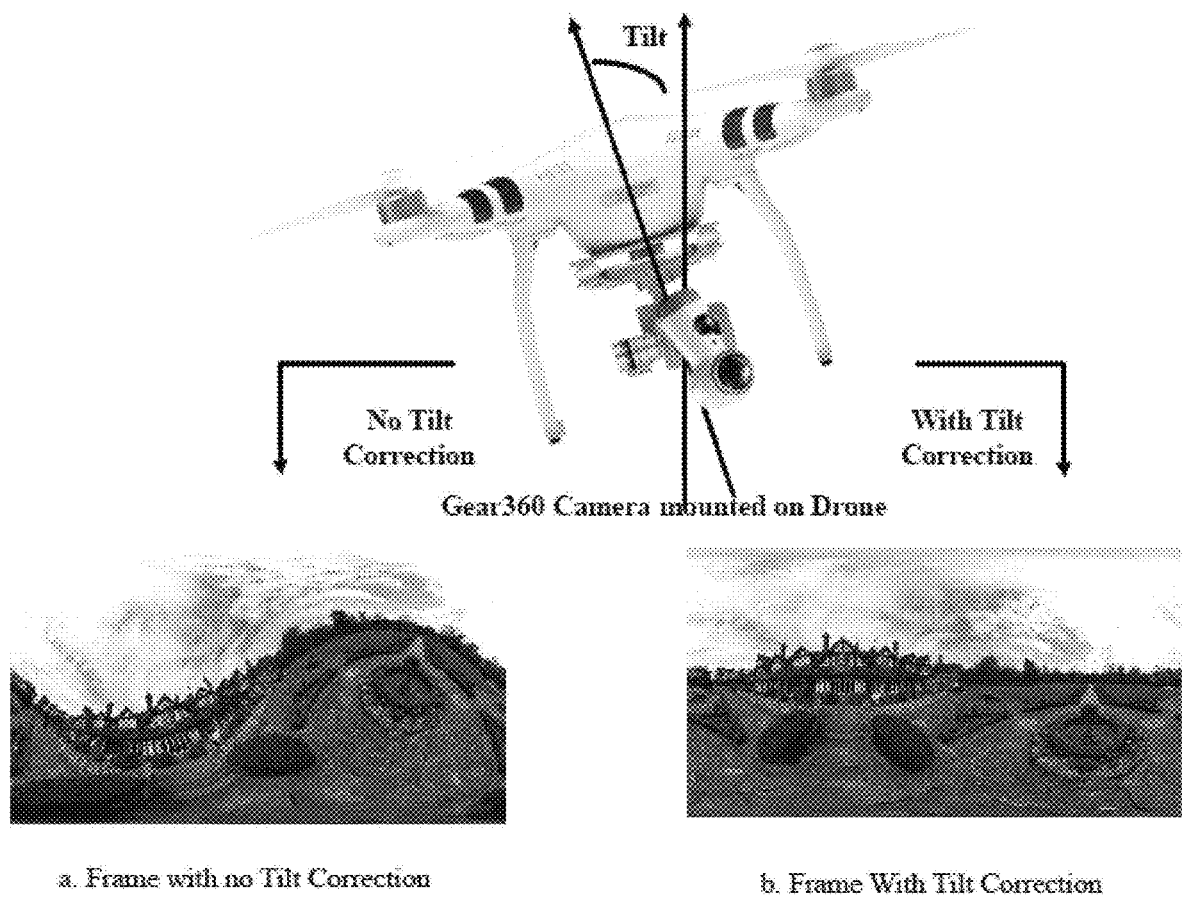
FIG. 16 illustrates a 360 camera removing shakiness and performing tilt correction, according to an embodiment.
Figure 17:
FIG. 17 illustrates a 360 camera removing shakiness and performing tilt correction, according to an embodiment.
Figure 18:
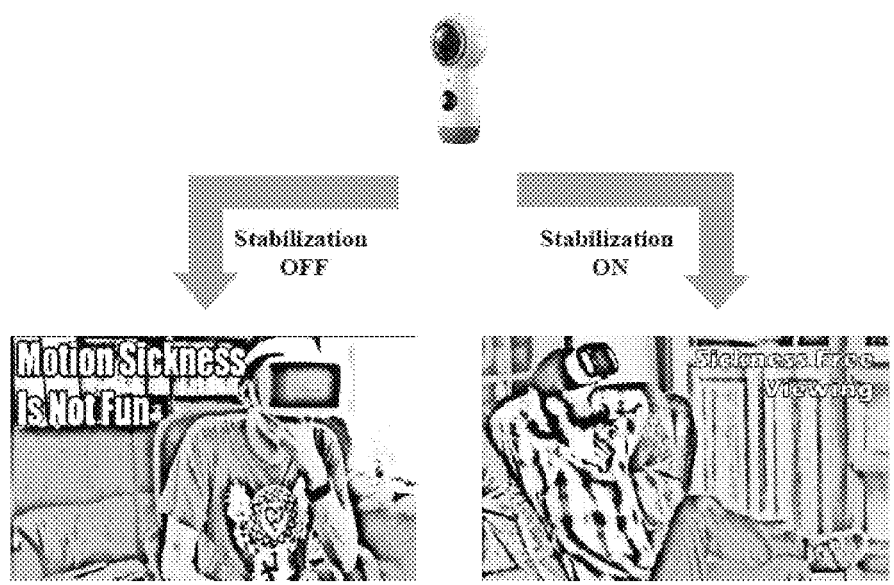
FIG. 18 illustrates a 360 camera removing shakiness and performing tilt correction, according to an embodiment.

FIGS. 16-18 illustrate a 360 camera removing shakiness and performing tilt correction, according to embodiments.

Referring to FIG. 16, a 360 degree camera is mounted on a drone to capture video. During flight, the drone may not remain perfectly horizontal. Consequently, there are chances of misalignment between the successive frames. Due to vibration of the motor, atmospheric condition, piloting error, etc., the drone may not be in stable condition for recording.

Frame a of FIG. 16 indicates the frame without tilt correction, and frame b of FIG. 16 indicates the frame with tilt correction according to an embodiment.

Referring to FIG. 17, a 360 degree camera is mounted on a bike to capture video while riding. Similar to the drone of FIG. 16, while riding, the bike may not remain in a steady condition, and there are chances of misalignment between the successive frames.

In accordance with an embodiment of the disclosure, the 360 camera removes shakiness and any tilt issue, as well as maintains heading direction, which will reflect the turns taken by the user, thus giving the user a pleasant experience as illustrated in the FIG. 17.

Referring to FIG. 18, a 360 degree camera removes shakiness and corrects any tilt issue, as well as maintains a heading direction, in order to reflect turns taken by a user while the user is watching a video in an immersive mode (e.g., a VR mode, an augmented reality mode, etc.). This results in providing the better pleasant experience as illustrated in the FIG. 18.

The embodiments described herein can be implemented through at least one software program running on at least one hardware device and performing network management functions to control the elements.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method for handling 360 degree image content captured by a 360 degree camera, the method comprising:
   obtaining, by an electronic device, a sequence of 360 degree projection format image frames associated with the 360 degree image content and inertial measurement unit (IMU) rotation data associated with the 360 degree image content;
   determining a first relative rotation angle for each of the 360 degree projection format image frames with respect to a first 360 degree projection format image frame by tracking a set of feature points in each of the 360 degree projection format image frames;
   determining a second relative rotation angle for each of the 360 degree projection format image frames with respect to the first 360 degree projection format image frame by using the IMU rotation data;
   computing, by the electronic device, a relative rotation of the 360 degree image content based on the first and second relative rotation angles; and
   applying, by the electronic device, the relative rotation to at least one of the 360 degree projection format image frames.

2. The method of claim 1, wherein computing the relative rotation of the 360 degree image content comprises:
   determining an individual offset for each of the 360 degree projection format image frames;
   estimating a universal offset by calculating geometric median of the individual offset values for each of the 360 degree projection format image frames or by continuously predicting the universal offset using a signal processing filter; and
   computing the relative rotation of the 360 degree image content.

3. The method of claim 2, wherein the individual offset for each of the 360 degree projection format image frames is determined as a difference between the first relative rotation angle and the second relative rotation angle.

4. The method of claim 1, further comprising:
   estimating, by the electronic device, an angle difference value between yaw values of successive frames;
   comparing, by the electronic device, the angle difference value with a pre-determined threshold value; and
   applying, by the electronic device, the relative rotation to at least one of the 360 degree projection format image frames, based on a result of the comparing.

5. The method of claim 4, wherein comparing the angle difference value with the pre-determined threshold value comprises:
   detecting whether an angle difference of yaw values of first and second 360 degree projection format image frames is less than the pre-determined threshold value;
   compensating the yaw value of the second frame, when the angle difference of the yaw values of first and second 360 degree projection format image frames is less than the pre-determined threshold value; and smoothening a yaw value of the second frame, when the angle difference of the yaw values of first and second 360 degree projection format image frames is greater than the pre-determined threshold value.

6. A method for handling 360 degree image content captured by a 360 degree camera, the method comprising:
obtaining, by an electronic device, a sequence of 360 degree projection format image frames associated with the 360 degree image content and inertial measurement unit (IMU) rotation data associated with the 360 degree image content;
estimating, by the electronic device, an angle difference value between yaw values of successive 360 degree projection format image frames;
comparing, by the electronic device, the angle difference value with a pre-determined threshold value; and
applying, by the electronic device, a relative rotation to at least one of the 360 degree projection format image frames, based on a result of the comparing.

7. The method of claim 6, wherein comparing the angle difference value with the pre-determined threshold value comprises:
detecting whether an angle difference of yaw values of first and second 360 degree projection format image frames is less than the pre-determined threshold value;
compensating the yaw value of the second 360 degree projection format image frame, when the angle difference of the yaw values of first and second 360 degree projection format image frames is less than the pre-determined threshold value; and
smoothening a yaw value of the second frame, when the angle difference of the yaw values of first and second 360 degree projection format image frames is greater than the pre-determined threshold value.

8. The method of claim 6, further comprising:
computing, by the electronic device, a relative rotation of the 360 degree image content; and
applying, by the electronic device, the relative rotation to at least one of the 360 degree projection format image frames.

9. The method of claim 8, wherein computing the relative rotation of the 360 degree image content comprises:
determining a first relative rotation angle for each of the 360 degree projection format image frames with respect to a first 360 degree projection format image frame by tracking a set of feature points in each of the 360 degree projection format image frames;
determining a second relative rotation angle for each of the 360 degree projection format frames with respect to the first 360 degree projection format image frame by using the IMU rotation data;
determining an individual offset for each of the 360 degree projection format image frames;
estimating a universal offset by calculating geometric median of the individual offset values for each of the 360 degree projection format frames or by continuously predicting the universal offset using a signal processing filter; and
computing the relative rotation of the 360 degree image content.

10. The method of claim 9, wherein the individual offset for each of the 360 degree projection format image frames is determined as a difference between the first relative rotation angle and the second relative rotation angle.

11. An electronic device for handling 360 degree image content captured by a 360 degree camera, the electronic device comprising:
a processor;
a memory; and
a 360 degree image content handler, coupled with the processor and the memory, configured to:
obtain a sequence of 360 degree projection format image frames associated with the 360 degree image content and inertial measurement unit (IMU) rotation data associated with the 360 degree image content;
determine a first relative rotation angle for each of the 360 degree projection format image frames with respect to a first 360 degree projection format image frame by tracking a set of feature points in each of the 360 degree projection format image frames;
determine a second relative rotation angle for each of the 360 degree projection format image frames with respect to the first 360 degree projection format image frame by using the IMU rotation data;
compute a relative rotation of the 360 degree image content based on the first and second relative rotation angles; and
apply the relative rotation to at least one of the 360 degree projection format image frames.

12. The electronic device of claim 11, wherein the 360 degree image content handler is further configured to compute the relative rotation of the 360 degree image content by:
determining an individual offset for each of the 360 degree projection format image frames;
estimating a universal offset by calculating geometric median of the individual offset values for each of the 360 degree projection format image frames or by continuously predicting the universal offset using a signal processing filter; and
computing the relative rotation of the 360 degree image content.

13. The electronic device of claim 12, wherein the individual offset for each of the 360 degree projection format image frames are determined as a difference between the first relative rotation angle and the second relative rotation angle.

14. The electronic device of claim 11, where the 360 degree image content handler is further configured to:
estimate an angle difference value between yaw values of successive frames;
compare the angle difference value with a pre-determined threshold value; and
apply the relative rotation to at least one of the 360 degree projection format image frames, based on a result of the comparing.

15. The electronic device of claim 14, wherein the 360 degree image content handler is further configured to compare the angle difference value with the pre-determined threshold value by:
detecting whether an angle difference of yaw values of first and second 360 degree projection format image frames is less than the pre-determined threshold value;
compensating the yaw value of the second frame, when the angle difference of the yaw values of first and second 360 degree projection format image frames is less than the pre-determined threshold value; and
smoothening a yaw value of the second frame, when the angle difference of the yaw values of first and second 360 degree projection format image frames is greater than the pre-determined threshold value.

16. An electronic device for handling 360 degree image content captured by a 360 degree camera, the electronic device comprising:
a processor;

a memory; and a 360 degree image content handler, coupled with the processor and the memory, configured to:

obtain a sequence of 360 degree projection format image frames associated with the 360 degree image content and inertial measurement unit (IMU) rotation data associated with the 360 degree image content;

estimate an angle difference value between yaw values of successive 360 degree projection format image frames;

compare the angle difference value with a pre-determined threshold value; and apply a relative rotation to at least one of the 360 degree projection format image frames, based on a result of the comparing.

17. The electronic device of claim 16, wherein the 360 degree image content handler is further configured to compare the angle difference value with the pre-determined threshold value by:

detecting whether an angle difference of yaw values of first and second 360 degree projection format image frames is less than the pre-determined threshold value; and compensating the yaw value of the second 360 degree projection format image frame, when the angle difference of the yaw values of first and second 360 degree projection format image frames is less than the pre-determined threshold value; and smoothening a yaw value of the second frame, when the angle difference of the yaw values of first and second 360 degree projection format image frames is greater than the pre-determined threshold value.

18. The electronic device of claim 16, wherein the 360 degree image content handler is further configured to:

compute a relative rotation of the 360 degree image content; and apply the relative rotation to at least one of the 360 degree projection format image frames.

19. The electronic device of claim 18, wherein the 360 degree image content handler is further configured to compute the relative rotation of the 360 degree image content by:

determining a first relative rotation angle for each of the 360 degree projection format image frames with respect to a first 360 degree projection format image frame by tracking a set of feature points in each of the 360 degree projection format image frames;

determining a second relative rotation angle for each of the 360 degree projection format frames with respect to the first 360 degree projection format image frame by using the IMU rotation data;

determining an individual offset for each of the 360 degree projection format image frames;

estimating a universal offset by calculating geometric median of the individual offset values for each of the 360 degree projection format frames or by continuously predicting the universal offset using a signal processing filter; and computing the relative rotation of the 360 degree image content.

20. The electronic device of claim 19, wherein the individual offset for each of the 360 degree projection format image frames are determined as a difference between the first relative rotation angle and the second relative rotation angle.

* * * * *